US007297207B2

(12) United States Patent
Reddy et al.

(10) Patent No.: US 7,297,207 B2
(45) Date of Patent: Nov. 20, 2007

(54) BIODEGRADABLE DISPERSANTS FOR CEMENT COMPOSITIONS AND METHODS OF CEMENTING IN SUBTERRANEAN FORMATIONS

(75) Inventors: B. Raghava Reddy, Duncan, OK (US); Larry S. Eoff, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 71 days.

(21) Appl. No.: 11/205,920

(22) Filed: Aug. 16, 2005

(65) Prior Publication Data

US 2005/0274291 A1    Dec. 15, 2005

Related U.S. Application Data

(62) Division of application No. 10/413,650, filed on Apr. 15, 2003.

(51) Int. Cl.
  *C04B 24/10* (2006.01)
(52) U.S. Cl. ..................................... 106/703
(58) Field of Classification Search ............... 106/730, 106/724
  See application file for complete search history.

(56) References Cited

U.S. PATENT DOCUMENTS

| | | | |
|---|---|---|---|
| 2,662,024 A * | 12/1953 | Riddell et al. | |
| 3,359,225 A | 12/1967 | Weisend | |
| 3,411,926 A * | 11/1968 | Gogek et al. | |
| 3,414,467 A * | 12/1968 | Ferrara | |
| 3,503,768 A * | 3/1970 | Previte | |
| 4,061,611 A | 12/1977 | Glowaky et al. | |
| 4,233,162 A | 11/1980 | Carney | |
| 4,522,653 A | 6/1985 | Rao et al. | |
| 4,557,763 A | 12/1985 | George et al. | |
| 4,818,288 A | 4/1989 | Aignesberger et al. | |
| 4,841,040 A * | 6/1989 | Just et al. ................ 536/105 |
| 4,883,125 A | 11/1989 | Wilson et al. | |
| 5,105,885 A | 4/1992 | Bray et al. | |
| 5,247,086 A | 9/1993 | Cain et al. | |
| 5,292,367 A | 3/1994 | Bloys et al. | |
| 5,641,584 A * | 6/1997 | Anderson et al. ........... 428/703 |
| 5,900,053 A | 5/1999 | Brothers et al. | |
| 6,019,835 A | 2/2000 | Chatterji et al. | |
| 6,143,069 A | 11/2000 | Brothers et al. | |
| 6,182,758 B1 | 2/2001 | Vijn et al. | |
| 6,319,312 B1 * | 11/2001 | Luongo ..................... 106/675 |
| 6,332,921 B1 | 12/2001 | Brothers et al. | |
| 6,379,446 B1 | 4/2002 | Andersen et al. | |
| 6,488,763 B2 | 12/2002 | Brothers et al. | |
| 6,626,242 B2 * | 9/2003 | D'Almeida et al. ......... 166/292 |

FOREIGN PATENT DOCUMENTS

| | | |
|---|---|---|
| EP | 1 081 112 A1 | 7/2001 |
| EP | 1 375 819 A1 | 1/2004 |
| GB | 1183688 | 3/1972 |

OTHER PUBLICATIONS

Answer 55 of 95 Chemical Abstracts STN☐☐JP 10298203, Nov. 1998, Wakabayashi et al. (abstract only).*
Answer 53 or 95 Chemical Abstracts STN☐☐JP 11012301 Jan. 1999 Shinpo et al. (abstract only).*
Office action dated Oct. 20, 2006 from U.S. Appl. No. 10/413,650.
Halliburton brochure entitled "CFR-3 Cement Friction Reducer Dispersant" dated 1998.
Halliburton brochure entitled "ThermaLock™ Cement For Corrosive CO2 Environments" dated 1999.
Foreign communication from a related counterpart application dated Jul. 12, 2004.
Office action dated Jul. 31, 2006 from U.S. Appl. No. 10/413,650.
Office Action dated Feb. 10, 2005 for U.S. Appl. No. 10/413,650.
Office Action dated Mar. 17, 2006 for U.S. Appl. No. 10/413,650.
Office Action dated Mar. 23, 2007 for U.S. Appl. No. 10/413,650.

* cited by examiner

*Primary Examiner*—Paul Marcantoni
(74) *Attorney, Agent, or Firm*—Craig W. Roddy; Baker Botts, LLP

(57) ABSTRACT

Hydraulic cement compositions are provided that include a cement, water; and a dispersant that comprises a low molecular weight starch with anionic groups. The starch dispersants provided may possess desirable biodegradable properties making them particularly suitable for certain downhole well operations.

19 Claims, No Drawings

BIODEGRADABLE DISPERSANTS FOR CEMENT COMPOSITIONS AND METHODS OF CEMENTING IN SUBTERRANEAN FORMATIONS

CROSS-REFERENCE TO RELATED APPLICATION

This application is a divisional patent application of commonly-owned U.S. patent application Ser. No. 10/413,650, filed Apr. 15, 2003, entitled "Biodegradable Dispersants for Cement Compositions and Methods of Cementing in Subterranean Formations," by B. Raghava Reddy, et al., which is incorporated by reference herein for all purposes.

BACKGROUND

The present invention relates to subterranean cementing operations, and more particularly, to improved cement dispersants for cement compositions and methods of cementing in subterranean formations.

Hydraulic cement compositions are commonly utilized in subterranean applications including but not limited to well completion and remedial operations. For example, in well applications, hydraulic cement compositions are used in primary cementing operations whereby strings of pipe such as casing and liners are cemented in well bores. In performing primary cementing, a hydraulic cement composition is pumped into the annular space between the walls of a well bore and the exterior surface of the pipe string disposed therein. The cement composition is permitted to set in the annular space, thereby forming an annular sheath of hardened substantially impermeable cement therein that substantially supports and/or positions the pipe string in the well bore and bonds the exterior surfaces of the pipe string to the walls of the well bore. Hydraulic cement compositions are also used in remedial cementing operations such as plugging highly permeable zones or fractures in well bores, plugging cracks in holes in pipe strings, and the like.

Dispersants are often used in subterranean well cement compositions to facilitate mixing the cement composition. Such dispersants are extensively used, inter alia, to reduce the apparent viscosities of the cement compositions in which they are utilized to allow the cement composition to be pumped with less friction pressure and less horsepower. In addition, the lower viscosity often allows the cement composition to be pumped in turbulent flow. Turbulent flow characteristics are desirable, for instance, when pumping cement compositions into subterranean wells to more efficiently remove drilling fluid from surfaces in the well bore as the drilling fluid is displaced by the cement composition being pumped. The inclusion of dispersants in cement compositions is also desirable in that the presence of the dispersants may facilitate the mixing of the cement compositions and reduce the water required. This may be desirable because cement compositions having reduced water content are often characterized by improved compressive strength development.

A number of dispersing agents have been utilized heretofore in cement compositions, particularly in cement compositions used for primary and remedial cementing in subterranean wells. One of the most common cement slurry dispersants is a condensate product of sulfonated naphthalene and formaldehyde. Such dispersants are problematic, however, because they are not substantially biodegradable, and hence, do not meet the regulatory requirements in some countries for use as dispersants.

Another conventional cement composition dispersant is the condensation product of formaldehyde, acetone, and an alkali metal sulfite. One formulation of this conventional dispersant is commercially available under the trade designation "CFR-3" from Halliburton Energy Services, Inc., of Duncan, Okla. While this and other similar dispersants may function well as dispersants in cement compositions, they are often environmentally unacceptable for use in wells subject to more stringent environmental regulations. Their unacceptability in these environments stems from, inter alia, their inability to undergo complete biodegradation in the environment, which may result in undesirable environmental effects if either accidentally or intentionally released into the environment.

SUMMARY

The present invention provides biodegradable cement slurry dispersants, cement compositions comprising such dispersants, and methods of cementing in a subterranean formation.

In one embodiment, a hydraulic cement composition may comprise a cement; water; and a dispersant wherein the dispersant comprises a low molecular weight starch that comprises anionic groups.

In another embodiment, a hydraulic cement composition for use in subterranean formations may comprise a cement; water wherein the water is present in an amount in the range of from about 30% to about 110% by weight of the cement in the hydraulic cement composition; and a biodegradable dispersant wherein the biodegradable dispersant comprises a low molecular weight starch that comprises anionic groups wherein the low molecular weight starch has a molecular weight of about 1,000 to about 5,000 wherein the dispersant is present in the cement composition in an amount of from about 0.01% to abut 5%.

The features and advantages of the present invention will be apparent to those skilled in the art. While numerous changes may be made by those skilled in the art, such changes are within the spirit of the invention.

DESCRIPTION OF PREFERRED EMBODIMENTS

The biodegradable dispersants of the present invention comprise a starch-based material. Starch is a polymer of glucose in which monosaccharide units are linked by 1,4'-α-glycoside bonds. Starches suitable for use in accordance with the present invention may be obtained from renewable glucose sources such as potatoes, corn, maize, tapioca, other cereal grains, and the like. Combinations of starches from combinations of sources are also suitable. The starch-based dispersants of the present invention are advantageous, because they are, inter alia, biodegradable and should not cause undesirable environmental effects.

The starches used in the present invention preferably should be characterized by a low molecular weight, in the range of about 500 to about 10,000, or more preferably about 1,000 to about 5,000. Examples of low molecular weight starches include dextrinized starches and starches degraded with acids, peroxides, or other oxidizing agents. For dextrinized starches, heat or acid treatment methods may reduce the molecular weight of the starch. These starches can be used with or without reacting them with suitable reagent groups to add anionic groups that may increase their dispersing ability as discussed below.

In the case of non-oxidized, low molecular weight starches such as acid, peroxide, or heat degraded starches, the starch can be further reacted with suitable reagents to introduce anionic groups. Similarly, to enhance the dispersing action of any suitable starch, the starch may be modified to incorporate anionic charges. Anionic groups that may be useful include but are not limited to: sulfite, sulfate, sultonate, carboxylate, silicate, nitrate, and nitrite groups. These anionic groups can be added to the starch by reacting the starch with an agent capable of producing the anionic groups, including but not limited to hypochlorite, peracetic acid, hydrogen peroxide, sodium periodate, sodium persulfate, sodium percarbonate, propane sultone, butane sultone, chloroacetic acid, dinitrogen tetroxide, 3-chloropropyl-triethoxy silane, 3-glycidoxy-propyltrimethoxy-silane, or the like.

Additionally, when the starch contains substantially carbonyl groups, particularly aldehyde groups, it can be further reacted with a sulfite salt to provide a sulfite adduct of an oxidized starch; sulfite adducts of oxidized starches are especially suitable for use in accordance with the present invention. Another method of forming a sulfite adduct of an oxidized starch includes reacting an acetone formaldehyde condensate with starch under alkaline conditions, followed by addition of a sulfite salt as described in U.S. Pat. No. 5,247,086. Other suitable starches include propylene oxide modified starches, ethylene oxide modified starches, and lightly crosslinked starches.

In preferred embodiments of the present invention, the starch in the dispersant is oxidized. Oxidation of starches either with hypochlorite, hydrogen peroxide, sodium periodate, or the like is suitable as such oxidation is likely to produce starch molecules that have carbonyl groups, particularly aldehydes, and carboxylate groups. When the oxidized starch comprises carboxylate groups, the material itself may be used as dispersant or further reacted with a sulfite salt to produce dispersant containing both sulfite and carboxylate anionic groups.

The anionic groups discussed above are thought to provide, inter alia, dispersing action in highly viscous slurries, e.g., slurries having a low water to cement ratio, or slurries containing a large fraction of solids, without substantially affecting the time in which the cement composition sets therein.

The solubility and storage characteristics of the dispersants of the present invention depend at least in part on the structural features of the starch or starches utilized. For example, one type of starch contains two components, namely a linear polymer molecule referred to as amylose, and a branched polymer molecule referred to as amylopectin. High amylose starches are typically not cold-water soluble. Heating such starch suspensions usually dissolves the starch. Upon cooling, the solutions become viscous gels. Additionally, these solutions may continue to viscosify with time due to the alignment of linear starch molecules in a process called retrogradation. Such high amylose starches, when modified to function as dispersants for cement slurries, may be more suitable for dry blending. On the other hand, high amylopectin-containing starches are significantly more cold-water soluble and the solutions are less likely to gel at room temperature. Such starches may be more amenable to a liquid form. Additionally, as will be recognized by those skilled in the art with the benefit of this disclosure, the water solubility of starches can further be increased by introducing low levels of cationic groups in the form of quaternary ammonium groups. Such cationizations are carried out by reacting starch with, e.g., glycidylpropyltrialkylammonium salts. This may decrease the tendency of a starch to gel while stored.

The biodegradable dispersants of the present invention may be utilized in any subterranean cementing applications. All cements suitable for use in subterranean cementing operations may be used in accordance with the present invention. In one embodiment, the improved cement compositions of the present invention comprise a hydraulic cement, sufficient water to form a pumpable slurry, and a biodegradable starch-based dispersant of the present invention in an amount effective to reduce the apparent viscosity of the cement composition prior to when it gels and sets. In certain embodiments, the biodegradable dispersant of the present invention is included in the cement composition in the amount of from about 0.01% to about 5.0%. In other embodiments, the dispersant may be added in a range of from about 0.2% to 3.0%. A variety of hydraulic cements can be utilized in accordance with the present invention including those comprised of calcium, aluminum, silicon, oxygen, and/or sulfur, which set and harden by reaction with water. Such hydraulic cements include, but are not limited to, Portland cements, pozzolana cements, gypsum cements, high alumina content cements, silica cements, and high alkalinity cements. Portland cements are generally preferred. In some embodiments, the Portland cements that are suited for use in conjunction with the present invention are classified as Class A, C, H, and G cements according to American Petroleum Institute, *API Specification for Materials and Testing for Well Cements*, API Specification 10, Fifth Ed., Jul. 1, 1990. Another useful cement for certain embodiments of the present invention include a cement that is commercial available under the tradename "THERMALOCK™" from Halliburton Energy Services, Inc., in Duncan, Okla., and described in U.S. Pat. No. 6,488,763, herein incorporated by reference. The dispersants of the present invention are also suitable for use with low-density cements. Such low-density cements may be foamed cements or may be cements comprising another means to reduce their density such as hollow microspheres, low-density elastic beads, or other density-reducing additives known in the art.

The dispersants of the present invention can be used in a liquid or solid form, depending on the application. For example, a dispersant of the present invention in a powder form can be blended with dry cement prior to mixing with water. Such dry blends are generally preferred when the wells to be cemented are on land. In offshore applications, it is preferred that the dispersants are in a solution or suspension form.

The water utilized in the cement compositions of this invention can be fresh water, salt water (e.g., water containing one or more salts dissolved therein), brine (e.g., saturated salt water produced from subterranean formations), or seawater. Generally, the water can be from any source provided that it does not contain an excess of compounds that adversely affect other components in the cement composition. The water preferably is present in an amount sufficient to form a pumpable slurry. More particularly, the water is present in the cement compositions in an amount in the range of from about 30% to about 110% by weight of hydraulic cement therein, more preferably in an amount of about 40%.

One example of a composition of the cement compositions of the present invention is comprised of a hydraulic cement; water present in an amount in the range of from about 30 to 110% by weight of cement in the composition; and a starch-based biodegradable dispersant of the present invention, present in an amount in the range of from about 0.2 to 3.0% by weight of cement in the composition.

As will be recognized by those skilled in the art, when the cement compositions of the present invention are utilized for primary or remedial subterranean well operation, such compositions can also include additional additives such as fluid loss additives, weighting materials, light weight material, set retarders, accelerators, and the like. The cement compositions also can include other additives such as accelerators or retarders, if desired. If an accelerant is used, it is preferably calcium chloride. Also, if used, in certain embodiments, such accelerants are present in an amount in the range from about 1.0% to about 4.0% by weight of the cement in the compositions. Fluid loss additives such as hydroxyethylcellulose, carboxymethylcellulose, carboxymethylhydroxyethylcellulose, hydroxypropylcellulose, hydroxypropylguar, guar, polyvinylalcohol, synthetic polyelectrolytes are also suitable.

To facilitate a better understanding of the present invention, the following examples of certain aspects of some embodiments are given. In no way should the following examples be read to limit, or define, the scope of the invention.

EXAMPLES

A number of test cement compositions were prepared using a Standard Grade Class A hydraulic cement mixed with a sufficient amount of fresh water to form a pumpable slurry. One of the test compositions contained a conventional dispersant, specifically CFR-3 dispersant, and other samples contained examples of dispersants of the present invention. Another control sample was tested wherein no dispersant was added to the cement composition. In addition, to illustrate the effects of oxidizing the starch, another control sample was tested wherein the starch in the starch-based dispersant was not oxidized prior to combining it with the cement.

Tables 1, 2 and 3 list the characteristics of the illustrative dispersants of the present invention that were tested. Table 4 indicates how much and which type of the dispersant of the present invention were added to a given cement composition. Tables 5A and 5B list the rheological properties of the cement compositions comprising the dispersants of the present invention. The Comparative Tables below illustrate the properties of the control samples discussed above.

TABLE 1

Examples of Dispersants of the Present Invention.

| Sample | Starch | Weight % Starch | Weight % Bisulfite | Weight % Sulfite | Reaction Temperature (° C.) | Reaction Time (hours) |
|---|---|---|---|---|---|---|
| A | Dialdehyde Starch | 1.7 | 1.9 | — | 56 | 16 |
| B | Dialdehyde Starch | 3.8 | — | 5.2 | 63 | 8.5 |
| C | Dialdehyde Starch | 5.3 | — | 3.6 | 72 | 5 |

Dispersant No. A was made as follows. A suspension of a dialdehyde starch (1.7% by weight) purchased from Sigma-Aldrich Chemical Company in water was mixed with sodium bisulfite (1.9% by weight) and reacted at 56° C. for 16 hours. The dialdehyde starch is an oxidized starch. The concentration of solids in the final mixture was 8.39%; the solution density was 1.05 g/cc. The reaction mixture was a colorless solution. 1.0% by weight of this dispersant was added to a standard cement mixture to form Cement Composition No. 2 shown in Table 4.

Dispersant No. B was made as follows. A suspension of a dialdehyde starch (3.8% by weight) from Sigma-Aldrich Chemical Company was mixed with 5.2% by weight sodium sulfite and 225.4 grams of water at 63° C. for 8.5 hours to obtain a dark brown colored suspension. The resultant suspension had a density of 1.2 g/cc and a solids concentration of 10%. 1.0% by weight of this dispersant was added to a standard cement mixture to form Cement Composition No. 3 shown in Table 4.

Dispersant No. C was made as follows. A suspension of a dialdehyde starch (5.3% by weight) from Sigma-Aldrich Chemical Company was mixed with 3.6% by weight sodium sulfite and 225.4 grams of water. The components were reacted at 72° C. for 5 hours to obtain a dark brown colored suspension. The resultant suspension had a density of 1.2 g/cc and a solids concentration of 10%. 0.2% by weight of this dispersant was added to a standard cement mixture to form Cement Composition No. 7 shown in Table 4.

TABLE 2

Examples of Dispersants of the Present Invention.

| Sample | Starch | Weight % Starch | Weight % Hypochlorite | Weight % Sulfite | Reaction Temp. | Reaction Time |
|---|---|---|---|---|---|---|
| D | High Amylose Starch[1] | 8.2 | 0.8 | 4.7 | 53 | 3 |
| E | High Amylose Starch[1] | 8.1 | 0.8 | 4.6 | 53 | 24 |

[1]Obtained from National Starch and Chemical Company of Bridgewater, New Jersey.

Dispersant No. D was made as follows. A suspension of a high amylose starch was obtained from National Starch. 8.2% by weight of the starch was mixed with 0.8% of hypochlorite to oxidize the starch. The oxidized starch was reacted with 4.7% by weight of sodium sulfite at 53° C. for 3 hours to produce the dispersant. The concentration of solids in the dispersant was 11.5% and the density was 1.07 g/cc. The pH was 9.3. 0.2% by weight of this dispersant was added to a standard cement mixture to form Cement Composition No. 9 shown in Table 4.

Dispersant No. E was made as follows. A suspension of a high amylose starch obtained from National Starch and Chemical Company containing 8.1% by weight of the starch was mixed with 0.8% of hypochlorite to oxidize the starch. The oxidized starch was reacted with 4.6% by weight of sodium sulfite at 53° C. for 24 hours to produce the dispersant. The concentration of solids in the dispersant was 12.7% and the density was 1.06 g/cc. The pH was 7.1. 0.2% by weight of this dispersant was added to a standard cement mixture to form Cement Composition No. 10 shown in Table 4.

TABLE 3

Examples of Dispersants of the Present Invention.

| Sample | Starch | Weight % Starch | Weight % Periodate | Weight % Sulfite | Reaction Temp. | Reaction Time |
|---|---|---|---|---|---|---|
| F | High Amylose Starch[2] | 7.3 | 0.8 | 0.5 | 72 | 24 |
| G | High Amylose Starch[2] | 7.3 | 0.8 | 0.5 | 72 | 24 |

[2]Obtained from National Starch and Chemical Company of Bridgewater, New Jersey Dispersant No. F was made as follows. A suspension of a high amylose starch was obtained from National Starch and Chemical Company containing 7.3% by weight of the starch. This was mixed with 0.8% of periodate to oxidize the starch and allowed to react for about 16 hours. The oxidized starch was reacted with 0.5% by weight of sodium sulfite at 72° C. for 24 hours to produce the dispersant. The concentration of solids in the dispersant was 7.8% and the density was 1.05 g/cc. 0.2% by weight of this dispersant was added to a standard cement mixture to form Cement Composition No. 11 shown in Table 4.

Dispersant No. G was made as follows. A suspension of a high amylose starch was obtained from National Starch and Chemical Company containing 7.3% by weight of the starch mixed with 0.8% of periodate to oxidize the starch and 0.5% by weight of sodium sulfite at 72° C. for 24 hours to produce the dispersant. The concentration of solids in the dispersant was 7.8% and the density was 1.05 g/cc. 0.2% by weight of this dispersant was added to a standard cement mixture to form Cement Composition No. 12 shown in Table 4.

To examine the effect of these examples of the dispersants of the present invention on the rheology of a typical cement slurry, each of these dispersants was added to a standard cement mixture. The cement mixture for each sample was a mix of a conventional hydraulic cement commonly used in subterranean well applications and a sufficient amount of water to form a slurry. A sufficient amount of each dispersant was added to the cement/water slurry to form a slurry having about 16.4 lbs/gallon density. Table 4 lists the particular dispersant and the amount of which was added to the cement slurry. The particular dispersants are listed above in Tables 1-3.

TABLE 4

Cement Compositions Comprising Examples of Dispersants of the Present Invention.

| Cement Composition | Dispersant | Weight % of Dispersant Added to Cement |
|---|---|---|
| 2 | A | 1.0% |
| 3 | B | 1.0% |
| 4 | C | 0.2% |
| 5 | D | 0.2% |

TABLE 4-continued

Cement Compositions Comprising Examples of Dispersants of the Present Invention.

| Cement Composition | Dispersant | Weight % of Dispersant Added to Cement |
|---|---|---|
| 7 | E | 0.2% |
| 8 | F | 1.0% |
| 9 | G | 0.2% |
| 10 | H | 0.2% |
| 11 | I | 0.2% |
| 12 | J | 0.2% |

Tables 5A and 5B list the rheological properties of each of these cement compositions containing the illustrative dispersants of the present invention. The rheological properties of the test cement compositions were determined in accordance with the *Recommended Practice for Testing Well Cements*, API Recommended Practice 10B, 22nd Edition, December, 1997, of the American Petroleum Institute.

TABLE 5A

Rheological Properties of Cement Slurries Comprising Dispersants of the Present Invention Shown in Table 4.

| Viscosity, (cp) | Cement Composition No. 2 | Cement Composition No. 3 | Cement Composition No. 4 | Cement Composition No. 5 | Cement Composition No. 7 |
|---|---|---|---|---|---|
| 300 rpm | 49 | 33 | 49.5 | 43 | 46 |
| 200 rpm | 34 | 22 | 36 | 31 | 33.5 |
| 100 rpm | 18 | 11 | 23 | 19 | 20 |
| 60 rpm | 12 | 7 | 17 | 14 | 14 |
| 30 rpm | 7 | 4 | 14 | 10 | 9.5 |
| 6 rpm | 3 | 2 | 8 | 6.5 | 5.5 |
| 3 rpm | 3 | 1.5 | 7 | 6 | 5 |
| 600 rpm | 99 | 73 | 93 | 64 | 93 |

TABLE 5B

Rheological Properties of Cement Slurries Comprising Dispersants of the Present Invention Shown in Table 4.

| Viscosity, (cp) | Cement Composition No. 8 | Cement Composition No. 9 | Cement Composition No. 10 | Cement Composition No. 11 | Cement Composition No. 12 |
|---|---|---|---|---|---|
| 300 rpm | 39 | 41 | 43 | 43 | 74 |
| 200 rpm | 26 | 28 | 30 | 30 | 55 |
| 100 rpm | 13.5 | 15 | 18 | 16 | 36 |
| 60 rpm | 8.5 | 11 | 13 | 11 | 28 |
| 30 rpm | 5 | 6 | 9 | 7 | 23 |
| 6 rpm | 1.5 | 3.5 | 6 | 4.5 | 19 |
| 3 rpm | 1 | 3 | 5.5 | 4 | 16 |
| 600 rpm | 85 | 82 | 84 | not determined | 125 |

Another example was performed to illustrate, inter alia, that the sulfite adducts of an oxidized starch will disperse cement slurries. A 100 g sample of a 10% suspension in water of an oxidized starch, "D17F" obtained from Grain Processing Corp., of Muscatine, Iowa, was heated to 185° F. for 6 hours, at which time the suspension became stable to settling. The pH of the suspension was adjusted to 12.2, and 0.75 g of sodium sulfite was added. The mixture was heated to 185° F. for 4 hours. The resulting light yellow turbid mixture was tested in the cement slurry for its dispersing activity as follows. For comparison, a sample of the starch suspension after adjusting the pH but prior to the addition of sodium sulfite was also tested.

A cement slurry having a density of 16.4 lbs/gal containing 0.53% of the control oxidized starch by weight of the cement and another similar slurry containing the sulfite adduct of an oxidized starch were prepared and tested for rheology. The results are shown below in Table 6.

TABLE 6

Rheological Properties of Cement Slurries Comprising Dispersants of the Present Invention.

| Viscosity | Control Oxidized Starch | Sulfite Reacted Oxidized Starch |
|---|---|---|
| 300 rpm | 90 | 79 |
| 200 rpm | 70 | 58 |
| 100 rpm | 45 | 33 |
| 6 rpm | 22 | 10 |
| 3 rpm | 16 | 11 |
| 600 rpm | 150 | 150 |

From Table 6, it is evident that the sulfite addition product of an oxidized starch disperses cement slurries better than the control oxidized starch.

To determine how these illustrative dispersants of the present invention compared to conventional nonbiodegradable dispersants, a comparative test was run. To perform these tests, the same standard cement composition was made as described above (hydraulic cement and a sufficient amount of water to form a slurry) but a conventional widely accepted nonbiodegradable dispersant was added. This nonbiodegradable dispersant was CFR-3. 0.2% by weight of the dispersant was added to the cement composition. The resultant cement composition had a density of 16.4 lbs/gal.

COMPARATIVE TABLE 1

Control Sample, Cement Composition Containing Conventional Nonbiodegradable Dispersant.

| Cement Composition No. | Dispersant Type | % by weight of dispersant |
|---|---|---|
| 6 | Conventional CFR-3 | 0.2% |

The rheological properties of the cement composition containing the conventional nonbiodegradeable dispersant (Cement Composition No. 6) were determined as reported in Comparative Table 2.

COMPARATIVE TABLE 2

Rheological Characteristics of Cement Composition 6 Containing Conventional CFR-3 Composition in Comparative Table 1.

| RPM | Viscosity, cp |
|---|---|
| 300 rpm | 46 |
| 200 rpm | 34 |
| 100 rpm | 20 |
| 60 rpm | 14.5 |
| 30 rpm | 10 |
| 6 rpm | 7 |
| 3 rpm | 6.5 |
| 600 rpm | 100 |

As can be seen from Tables 5A, 5B, and Comparative Table 2, the biodegradable dispersants of the present invention imparted properties to cement compositions which compare closely with the properties imparted to the same cement compositions comprising a highly-accepted conventional nonbiodegradable dispersant. In particular, Cement Composition Nos. 5, 7, 9, 10, and 11 particularly appear to impart comparable properties to the cement compositions as the conventional nonbiodegradable dispersant.

Another control sample was also tested to determine the effectiveness of the illustrative dispersants of the present invention. In this second control sample, no dispersant was added to the cement mixture. The cement mixture contained hydraulic cement and water in an amount sufficient to form a slurry, and had a density of 16.4 lbs/gal. Comparative Table 3 lists the characteristics of this cement mixture.

COMPARATIVE TABLE 3

Control Sample, Cement Composition Having No Dispersant.

| Composition No. | Dispersant Type | % by weight of dispersant |
|---|---|---|
| 1 | None | None |

After forming this control sample with no dispersant, the rheological properties of the cement were determined. These are reported in Comparative Table 4.

COMPARATIVE TABLE 4

Rheological Properties for Control Sample of Comparative Table 3.

| RPM | Viscosity, cp |
|---|---|
| 300 rpm | 102 |
| 200 rpm | 87 |
| 100 rpm | 68 |
| 60 rpm | 60 |
| 30 rpm | 50 |
| 6 rpm | 24 |
| 3 rpm | 17 |
| 600 rpm | 164 |

As can readily be seen from examining Tables 5A, 5B, and Comparative Table 4, the dispersants of the present invention proved to be effective in reducing the viscosity of the cement mixture to a desirable level.

Another control test was performed to determine the effect of oxidizing the starch prior to reacting it with a sulfite. The control starch in this test was used to prepare dispersants D and E in Table 2. Reacting the oxidized starch with a sulfite is thought to provide anionic sulfite groups to the starch. The anionic sulfite groups are thought to contribute to the dispersing action of the dispersant in highly viscous slurries, e.g., slurries having a low water to cement ratio, or slurries containing a large fraction of solids.

COMPARATIVE TABLE 5

Cement Composition Wherein the Dispersant is a Starch That Was Not Oxidized or Reacted With a Sulfite.

| Composition No. | Dispersant Type | % by weight of dispersant |
|---|---|---|
| 13 | Starch Solution, National Starch High Amylose Starch (Not Oxidized) | 0.2% |

COMPARATIVE TABLE 6

Rheological Properties for Control Sample of Comparative Table 5.

| RPM | Viscosity, cp |
|---|---|
| 300 rpm | 81 |
| 200 rpm | 53 |
| 100 rpm | 27 |
| 60 rpm | 18 |
| 30 rpm | 10 |
| 6 rpm | 10 |
| 3 rpm | 11 |
| 600 rpm | 135 |

An examination of data for compositions 9 and 10 in Table 5B and Comparative Table 6 reveals that oxidizing the starch followed by reaction with a sulfite ion improves the dispersing characteristics of the starch-based dispersants of the present invention.

A high amylopectin starch sample derived from waxy maize containing siloxy anionic groups and cationic quaternary ammonium groups, available from National Starch and Chemical Company under the trade name "COBOND 2500" as a 15% starch solution in water was tested in the same cement slurry at a level of 1% by weight of cement. The rheology results are shown in Table 7.

COMPARATIVE TABLE 7

Rheological Properties of Cement Slurry Comprising a Dispersant of the Present Invention.

| RPM | Viscosity, cp |
|---|---|
| 300 rpm | 100 |
| 200 rpm | 75 |
| 100 rpm | 46 |
| 6 rpm | 23 |
| 3 rpm | 20 |
| 600 rpm | 170 |

A comparative slurry without Cobond 2500 provided the following rheology in Comparative Table 7.

COMPARATIVE TABLE 7

Control Slurry Having No Dispersant.

| RPM | Viscosity, cp |
|---|---|
| 300 rpm | 115 |
| 200 rpm | 102 |
| 100 rpm | 79 |
| 6 rpm | 25 |
| 3 rpm | 18 |
| 600 rpm | 213 |

The results from using siloxy-substituted starch show that siloxy anion substituted starches also disperse cement slurries.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A hydraulic cement composition comprising:
   a cement;
   water; and
   a dispersant that comprises a low molecular weight starch that comprises anionic groups, wherein:
   the low molecular weight starch has a molecular weight of about 500 to about 10,000; and
   the low molecular weight starch comprises a sulfite adduct of an oxidized starch.

2. The hydraulic cement composition of claim 1 wherein the low molecular weight starch comprises at least one starch derived from at least one starch selected from the group consisting of: potatoes, corn, maize, tapioca, and cereal grains.

3. The hydraulic cement composition of claim 1 wherein the low molecular weight starch has a molecular weight, of about 1,000 to about 5,000.

4. The hydraulic cement composition of claim 1 wherein the low molecular weight starch comprises a dextrinized starch.

5. The hydraulic cement composition of claim 1 wherein the low molecular weight starch comprises a starch degraded with an oxidizing agent or heat.

6. The hydraulic cement composition of claim 1 wherein the low molecular weight starch comprises at least one starch selected from the group consisting of: a dialdehyde starch, a high amylose starch, and a high amylopectin starch.

7. The hydraulic cement composition of claim 1 wherein the low molecular weight starch comprises at least one starch selected from the group consisting of: sulfite, sulfate, sulfonate, carboxylate, silicate, nitrate, and nitrite groups.

8. The hydraulic cement composition of claim 1 wherein the dispersant is present in the hydraulic cement composition in an amount sufficient to reduce the apparent viscosity of the hydraulic cement composition prior to when the hydraulic cement composition sets.

9. The hydraulic cement composition of claim 8 wherein the dispersant is present in the cement composition in an amount of from about 0.01% to about 5%.

10. The hydraulic cement composition of claim 1 wherein the cement has an apparent viscosity of less than about 100 cps at 300 rpm.

11. The hydraulic cement composition of claim 1 wherein the cement comprises at least one additive selected from the group consisting of: a gas component and a density-reducing additive.

12. The hydraulic cement composition of claim 1 wherein the water is present in an amount in the range of from about 30% to about 110% by weight of the cement in the hydraulic cement composition.

13. The hydraulic cement composition of claim 12 wherein the dispersant is present in an amount in the range of from about 0.01% to about 5%.

14. The hydraulic cement composition of claim 13 wherein the dispersant is present in an amount in the range of from about 0.2% to about 3%.

15. The hydraulic cement composition of claim 1 wherein the hydraulic cement composition has an apparent viscosity of less than about 170 at 600 rpm.

16. The hydraulic cement composition of claim 1 further comprising at least one additive selected from the following group: a fluid loss additive, a weighting material, a light weight material, a set retarder, and an accelerator.

17. A hydraulic cement composition for use in subterranean formations comprising:
   a cement;
   water that is present in an amount in the range of from about 30% to about 110% by weight of the cement in the hydraulic cement composition; and
   a biodegradable dispersant that comprises a low molecular weight starch that comprises anionic groups and has a molecular weight of about 1,000 to about 5,000 wherein:
   the dispersant is present in the cement composition in an amount of from about 0.01% to about 5%; and
   the low molecular weight starch comprises a sulfite adduct of an oxidized starch.

18. The hydraulic cement composition of claim 17 wherein the cement comprises at least one additive selected from the group consisting of: a gas component and a density-reducing additive.

19. The hydraulic cement composition of claim 17 wherein the dispersant is present in an amount in the range of from about 0.2% to about 3%.

* * * * *